Sept. 7, 1965     F. W. CRAWFORD ETAL     3,205,122
LAMINATES CONTAINING OIL SHALE
Filed Nov. 4, 1960
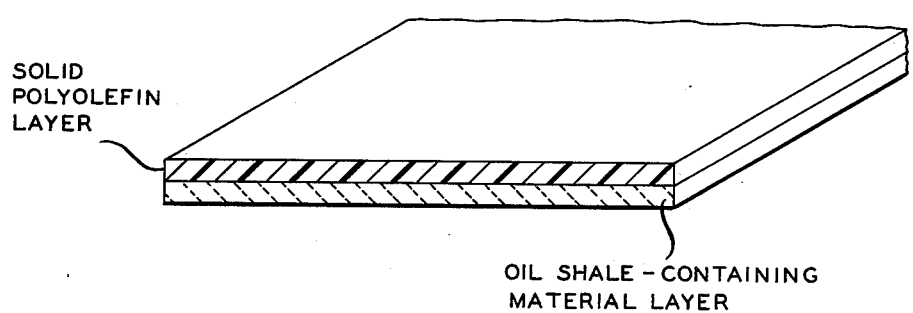
SOLID POLYOLEFIN LAYER
OIL SHALE-CONTAINING MATERIAL LAYER
INVENTORS
F. W. CRAWFORD
J. W. MARX
H. W. PARKER
BY Young and Quigg
ATTORNEYS

United States Patent Office 3,205,122
Patented Sept. 7, 1965

3,205,122
LAMINATES CONTAINING OIL SHALE
Francis W. Crawford, Manhattan, Kans., and John W. Marx and Harry W. Parker, Bartlesville, Okla., assignors to Phillips Petroleum Company, a corporation of Delaware
Filed Nov. 4, 1960, Ser. No. 67,175
15 Claims. (Cl. 161—247)

This invention relates to laminates containing oil shale and to a method for producing them. In one aspect this invention relates to laminates and their production from thermoplastic materials such as a solid polyolefin, oil shale, mixtures thereof, and fiberglas materials such as glass cloth.

It has been proposed to make molded articles from oil shales containing at least 45 gallons of oil per ton of mineral and more recently it has been proposed to utilize oil shale as a molding composition wherein the oil shale contains at least about 15 gallons of oil per ton of mineral by incorporating in the oil shale a finely divided polyolefin, sulfur, or an aldehyde which will volatilize at the molding temperature. These molded articles are thermoplastic as long as the molding temperature or temperature of use does not exceed the decomposition temperature of the kerogen present in the oil shale. Oil shale compositions containing an aldehyde become thermoset if subjected to continued heating at a temperature above about 300° F.

It is an object of this invention to provide laminates wherein at least one of the layers of the laminate contains an oil shale composition. Another object of this invention is to provide a method for preparing laminates wherein at least one of the layers of the laminate contains an oil shale composition. A further object of this invention is to provide a method for preparing laminates wherein at least one of the laminates contains an oil shale the properties of which have been modified by addition thereto of a quantity of a solid polyolefin, sulfur, or aldehyde which volatilizes at the molding temperature. Still another object of this invention is the provision of a method for preparing a laminate wherein at least one of the layers is glass cloth and at least one of the adjacent layers is a mixture of a solid polyolefin and oil shale. Other objects and advantages will be apparent to one skilled in the art upon studying this disclosure including the detailed description of the invention which follows.

The drawing illustrates a laminated structure according to the invention.

We have discovered that exceeding strong, well bonded laminates can be prepared wherein at least one of the layers of the laminate is a solid polyolefin or glass cloth and at least one of the adjacent layers is an oil shale containing at least 15 gallons of recoverable oil per ton of mineral or such oil shale modified by having admixed therewith a solid polyolefin, sulfur, or an aldehyde which will volatilize at the molding temperature. The laminates of this invention can be prepared by pressing together the layers of materials at moderate pressures and temperatures so that the kerogen of the oil shale becomes plasticized and combines physically, and possibly chemically, with the materials making up the adjacent layer such as the polyolefin. The pressures will ordinarily be in the range of about 500 to about 20,000 p.s.i. and the temperatures will usually be in the range of about 250 to about 400° F.

Oil shales containing from about 15 to 85 or more gallons of recoverable, nonbenzenoid-type oil per ton of mineral can be utilized in making the laminates of this invention and these oil shales are crushed or ground to an average particle size such as to pass through a 50 to 200 mesh screen and are then intimately admixed with a finely divided solid polyolefin, sulfur, or aldehyde, if such modifying agent is to be added to the oil shale. Oil shales containing about 25 to 35 gallons of recoverable oil per ton of mineral are preferred because of their availability and from the standpoint of excellence of the laminate layers prepared therefrom. The oil shale composition can be used in pulverulent form or the oil shale composition can be freely molded into sheets for the preparation of the laminates.

Any of the known solid polyolefins can be used in the preparation of the laminates of this invention; however, those polyolefins produced according to the process disclosed in U.S. Patent 2,825,721 are preferred because of their high molecular weights and their high values of crystallinity. Another satisfactory process comprises contacting ethylene or mixtures of ethylene with other olefins in a suspension of a chromium oxide-containing catalyst in a liquid hydrocarbon diluent, the contacting occurring at a temperature such that substantially all of the polymer produced is insoluble in the diluent and is in solid particle form; the particles being substantially non-tacky and non-agglutinative in the liquid diluent. The solid polyolefins applicable for use in the invention include polymers of ethylene and copolymers of at least one aliphatic olefin having from 3 to 8 carbon atoms in the chain, preferably 1-olefins and include propylene, 1-butene, cis-butene-2, trans-butene-2, pentenes, hexenes, heptenes, and octenes. Any commercial polyethylene can be utilized, although some sacrifices in surface hardness will result from use of the softer grades of polyolefin. In order to grind some of the softer polyolefins, it will usually be desirable to reduce the temperature of the polyolefin such as by grinding with Dry Ice in order to embrittle the polyolefin. When the polyethylene and the oil shale are blended together in a roll mill or a mixer, such as a Banbury mixer, it is not necessary to reduce the size of the polyethylene beyond that which would result from ordinary methods of manufacture.

Finely divided sulfur, commonly available as flour of sulfur, can be combined with oil shale in an amount of about 1 to about 20 weight percent, or more, of the mixture of oil shale and sulfur.

Liquid or finely divided solid aldehydes which will volatilize at the molding temperature can be mixed with the oil shale used in preparing the laminates of this invention. Aldehydes which are particularly useful in this invention include paraformaldehyde, paraldehyde, furfural, propionaldehyde, piperonal, benzaldehyde, citronellal, citral, and the like. When utilizing aldehydes which are volatile, such as acetaldehyde, or gaseous, such as formaldehyde, in modifying the oil shale compositions applicable for preparing the laminates of this invention, it is preferred to polymerize the aldehyde prior to use whereby the aldehyde can be utilized in liquid or solid form. Paraformaldehyde is particularly suitable for premixing with oil shale or for treating the fabricated sheets with gaseous aldehyde because it is easily converted into a gaseous form, i.e., formaldehyde. Any aldehyde which will volatilize at a temperature below the decomposition temperature of the kerogen of the oil shale, e.g., below about 600° F., can be utilized for modifying the properties of the oil shale by admixture with the oil shale prior to fabrication into sheets or for treating the fabricated sheets. The aldehyde is incorporated in the oil shale in an amount equivalent to about 0.25 to 1.25 mols of aldehyde per 100 parts by weight of kerogen of the oil shale.

Powdered oil shale can be sandwiched between prefabricated films or sheets of polyethylene or other polyolefin and the composite mass pressed at moderate pressure in the range of about 500 to 10,000 p.s.i. and a temperature in the range of about 250 to about 400° F. so as to plasticize the kerogen of the oil shale and the polyolefin so that the oil shale and the polyolefin are firmly bonded together to produce water repellant, solvent resistant sheets and slabs. Alternatively, the oil shale sheets and slabs may be prefabricated separately by pressure molding and then sandwiched between sheets of the polyolefin and then subjected to heat and pressure to effect bonding. In either event, the layers should be pressed together for a time sufficient to allow the materials of the laminate to be heated to plasticizing temperature throughout the laminated structure.

The addition of sulfur or an aldehyde to the oil shale composition increases the hardness of the composition whereas the addition of a solid polyolefin to the oil shale composition reduces the brittleness of the oil shale composition. The solid polyolefin can be combined with oil shale in all amounts; however, an amount of about 2 to about 95 weight per cent of polyolefin based on the total composition will generally be used and about 5 to 95 weight percent will usually be preferred where molded sheets and slabs are to be produced. About 5 to about 30 weight percent of polyolefin, based on the total composition, produces a particularly desirable finished article in that the hardness contributed by the oil shale is preserved and the brittleness of the oil shale is greatly reduced.

Laminates of glass cloth and oil shale or a mixture of a polyolefin and oil shale can be prepared from any of the grades of glass cloth available to produce an article wherein one surface of the glass cloth is preserved and the glass cloth is made rigid and its mechanical strength is improved by the oil shale composition securely bonded to the other side of the glass cloth. Polyolefin is advantageously admixed with the oil shale to decrease the brittle nature thereof and to enhance the compatability of the oil shale and the glass cloth. The oil shale, and, to a greater extent, a mixture of oil shale and a polyolefin, such as polyethylene, appear to wet the oil shale or to be wetted by the kerogen of the oil shale with the result that the plasticized kerogen or plasticized mixture of kerogen and polyolefin wet the glass cloth to create a tenacious bond between the oil shale composition and the glass cloth.

The following specific examples present data which illustrate and clarify the invention but should not be so interpreted as to restrict or limit the invention unnecessarily.

*Example I*

A layer of glass cloth was covered with a 3/16 inch layer of polyethylene having a density of 0.960 and a melt index of 0.9, as determined by the methods described in column 38 of U.S. Patent 2,825,721, and the layers were pressed together for two minutes at a pressure of 5000 p.s.i.g. and a temperature of about 170° F. Upon cooling the resulting laminate was examined. The layers appeared to be mechanically secured together and could be separated without damage to either layer.

A layer of glass cloth was covered with a 3/16 inch layer of a blend of 30 weight percent solid polyethylene, as above, and 70 weight percent of a Colorado oil shale containing 30 gallons of recoverable oil per ton of mineral. The oil shale-polethylene layer was prepared from finely divided (100 mesh) oil shale and solid polyethylene blended together. The layers were pressed together at 5000 p.s.i.g. and 165° F. for two minutes and were then cooled and examined. The layers were bonded together and could not be separated without damage to each of the layers. The polyethylene-oil shale blend appeared to have wet the glass fibers.

*Example II*

A 3/8 inch layer of oil shale, as in Example I, was covered with a 1/4 inch layer of polyethylene, as in Example I, and the layers were pressed together at a pressure of 5000 p.s.i.g. and a temperature of 316° F. for two minutes. The pressure was released after the layers had cooled for 10 minutes and the resulting laminate was examined. The layers were tenaciously bonded together and the polyethylene appeared to have permeated the adjacent portion of the oil shale layer.

*Example III*

Oil shale samples, as described in Example I, were blended with various materials including polyethylene, as described in Example I, sulfur, and paraformaldehyde, and were molded into discs in a mold at 5000 p.s.i. and 316° F. The mixed powder was placed in the mold and pressure and heat were applied. Molding was continued for 2 minutes after the temperature of 316° F. was reached and then the mold was cooled to below 200° F. and the pressure was released. Shore "D" hardness determinations were made on the cooled samples. Results were as follows:

| Oil Shale, Wt. percent | Polyethylene, Wt. percent | Sulfur, Wt. percent | Paraformaldehyde, Wt. percent | Shore "D", Initial | Hardness, Final |
|---|---|---|---|---|---|
| 100 | --- | --- | --- | 82-84 | 80-83 |
| 95 | 5 | --- | --- | 82 | 80 |
| 80 | 20 | --- | --- | 79 | 74 |
| 70 | 30 | --- | --- | 76 | 68 |
| 98 | --- | 2 | --- | 84 | 83 |
| 80 | --- | 20 | --- | 86 | 85 |
| 95 | --- | --- | 5 | 85 | --- |

The above results show the modifying effect of the various additives on the hardness property of the oil shale. Polyethylene reduces the brittleness of the oil shale and the sulfur and paraformaldehyde increase the hardness of the oil shale.

The laminates of this invention have many uses and can be fabricated in many forms. The laminates are particularly useful as building materials such as wall board, shingles, building paper, floor tiles, and road surfaces. Laminates of a layer of oil shale, natural or modified by addition thereto of sulfur or an aldehyde, and a layer of a normally solid polyolefin such as polyethylene are particularly useful for the fabrication of load-bearing beams where the beams are positioned so that the oil shale layer is under compression and the polyethylene layer is under tension.

Reasonable variations and modifications are possible within the scope of this disclosure without departing from the spirit and scope of the invention.

We claim:

1. A laminate comprising a plurality of layers wherein at least one layer is a solid polyolefin and at least one layer is a material selected from the group consisting of an oil shale containing at least about 15 gallons of oil per ton of mineral, a mixture of said oil shale and sulfur, a mixture of said oil shale and an aldehyde which will volatilize at molding temperature, and a mixture of said oil shale and about 2 to 95 weight percent of a solid polyolefin wherein said layers are bonded together by application of heat and pressure.

2. The laminate of claim 1 wherein at least one layer is polyethylene and an adjacent layer is a mixture of oil shale and about 2 to 95 weight percent of a solid polyolefin.

3. The laminate of claim 1 wherein at least one layer is formed from a mixture of oil shale and about 2 to 95 weight percent of a solid polyolefin.

4. The laminate of claim 1 wherein at least one layer prior to the application of said heat and pressure is formed from a mixture of oil shale and sulfur.

5. The laminate of claim 1 wherein at least one layer prior to the application of said heat and pressure is formed from a mixture of oil shale and an aldehyde which volatilizes at bonding temperature.

6. The method of making a laminate which comprises pressing together a first layer of a solid polyolefin and a second layer of a material selected from the group consisting of:
   (1) oil shale containing at least 15 gallons of recoverable oil per ton of mineral;
   (2) a mixture of oil shale containing at least 15 gallons of recoverable oil per ton of mineral and at least 1 weight percent, based on the total mixture, of sulfur;
   (3) a mixture of oil shale containing at least 15 gallons of recoverable oil per ton of mineral and about 2 to about 95 weight percent, based on the total mixture, of a solid polyolefin; and
   (4) a mixture of oil shale containing at least 15 gallons of recoverable oil per ton of mineral and an aldehyde, which will volatilize at the molding temperature, in a mixture ratio of about 0.25 to 1.25 mols of aldehyde per 100 parts by weight of kerogen in said oil shale, said layers being pressed together at a pressure in the range of about 500 to about 20,000 p.s.i. and a temperature in the range of about 150 to about 400° F. for a time sufficient to plasticize the polyolefin and the kerogen of the oil shale.

7. The method of claim 6 wherein the polyolefin of the first layer is polyethylene.

8. The method of claim 6 wherein the polyolefin of the first layer is polypropylene.

9. The method of claim 6 wherein the polyolefin of the first layer is a copolymer of ethylene and propylene.

10. The method of claim 6 wherein the polyolefin of the first layer is a copolymer of ethylene and 1-butene.

11. The method of claim 6 wherein the polyolefin of the first layer is a copolymer of ethylene and butene-2.

12. The method of claim 6 wherein at least one of the layers is a natural oil shale containing at least about 15 gallons of oil per ton of mineral.

13. The method of claim 6 wherein at least one of the layers is a mixture of oil shale containing at least about 15 gallons of oil per ton of mineral and sulfur, said mixture containing about 1 to about 20 weight percent sulfur.

14. The method of claim 6 wherein at least one of the layers is a mixture of oil shale containing at least about 15 gallons of oil per ton of mineral and an aldehyde, which will volatilize at the molding temperature, said mixture containing about 0.25 to 1.25 mols of aldehyde per 100 parts by weight of kerogen of the oil shale.

15. The method of claim 6 wherein at least one of the layers is solid polyethylene and an adjacent layer is a mixture of a solid polyolefin and oil shale wherein the oil shale contains at least about 15 gallons of oil per ton of mineral.

References Cited by the Examiner

UNITED STATES PATENTS

| | | | |
|---|---|---|---|
| 1,649,545 | 11/27 | Renou | 106—284 |
| 2,035,122 | 3/36 | Fulton | 154—45.9 |
| 2,475,699 | 7/49 | Derksen. | |
| 2,548,029 | 4/51 | Kurtz | 154—45.9 |
| 2,582,037 | 1/52 | Hyde | 154—50 |
| 2,676,155 | 4/54 | Farris | 154—128 |
| 2,686,744 | 8/54 | Cornwell | 154—50 |
| 2,893,907 | 7/59 | Bove. | |
| 2,900,269 | 8/59 | Bauman et al. | 106—241 |
| 2,956,723 | 10/60 | Tritsch | 156—306 |
| 3,053,680 | 9/62 | Parker et al. | 106—241 |
| 3,061,451 | 10/62 | Parker et al. | 106—241 |
| 3,072,593 | 1/63 | Marx et al. | 106—241 XR |
| 3,112,681 | 12/63 | Gessler et al. | 94—7 |

OTHER REFERENCES

"Fiberglas Reinforced Plastics" (1954), Reinhold Publishing Corporation, New York, pp. 27–38.

ALEXANDER WYMAN, *Primary Examiner.*

EARL M. BERGERT, CARL F. KRAFFT, *Examiners.*